(No Model.)
T. C. EDWARDS.
COUPLING.
No. 596,490.                     Patented Jan. 4, 1898.
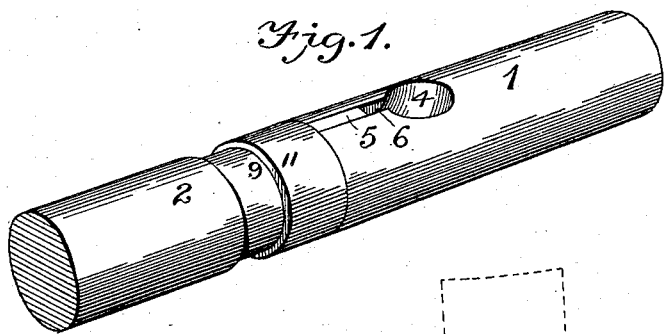
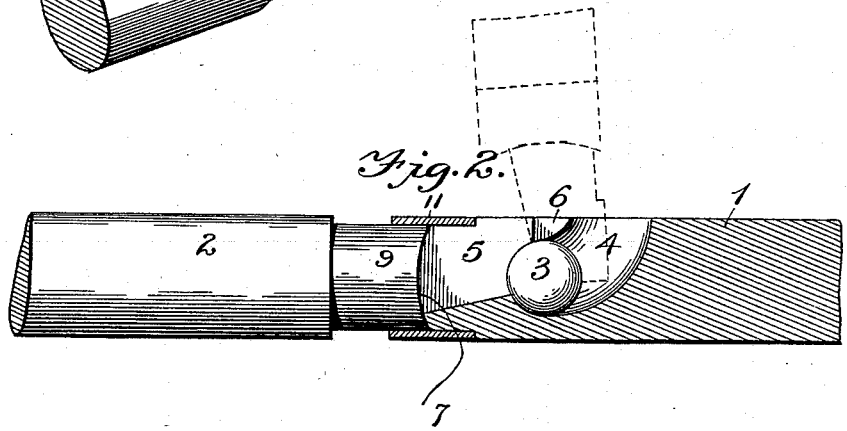
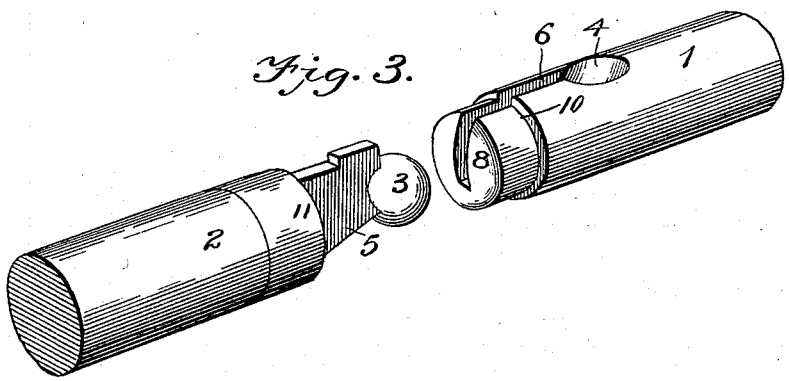
Inventor
*Thomas C. Edwards*
Witnesses
*Edwin G. McKee*
*J. B. Caplinger*
By his Attorneys,
*C. A. Snow & Co.*
THE NORRIS PETERS CO., PHOTO-LITHO., WASHINGTON, D. C.

UNITED STATES PATENT OFFICE.

THOMAS CLAY EDWARDS, OF SALINAS, CALIFORNIA.

COUPLING.

SPECIFICATION forming part of Letters Patent No. 596,490, dated January 4, 1898.

Application filed April 20, 1897. Serial No. 633,048. (No model.)

*To all whom it may concern:*

Be it known that I, THOMAS CLAY EDWARDS, a citizen of the United States, residing at Salinas, in the county of Monterey and State of California, have invented a new and useful Coupling, of which the following is a specification.

This invention relates to certain improvements in couplings such as are adapted for connecting rods or bars of metal in sectional form; and the object of the invention is to provide a coupling of a simple and inexpensive nature which shall be adapted for securely joining together two parts or sections of a rod, shaft, or the like, the connection between the parts being such as to permit them to be readily and conveniently detached when desired.

The invention consists in certain novel features of the construction, combination, and arrangement of the various parts of the improved coupling, whereby certain important advantages are attained and the device is made simpler, cheaper, and otherwise better adapted and more convenient for use, all as will be hereinafter fully set forth.

The novel features of the invention will be carefully defined in the claims.

In order that my improvements may be the better understood, I have shown in the accompanying drawings a coupling constructed according to my invention, in which drawings—

Figure 1 is a perspective view of a coupling, showing the parts thereof engaged with each other; and Fig. 2 is a sectional view taken axially through the members of the coupling, the male member thereof being shown in elevation. Fig. 3 is a perspective view showing the parts or members of the coupling separated from each other.

In the drawings, 1 indicates the female member of the coupling, and 2 indicates the male member, each of these members being formed on the end of one of the parts or sections of the rod or bar to be coupled, which rod or bar may be, for example, an electrical conductor. The member 1 of the coupling is provided with an opening or recess to receive the part or member 2, which is provided with a ball-like enlargement or head 3, fitting in an enlargement or chamber 4, comprised in said recess, and said member or part 2 is also provided with a reduced stem or neck 5 of flattened form connecting the head or enlargement 4 with the body of the member 2 of the coupling and adapted to fit in the reduced part 6 of the recess in the member 1, which reduced part extends from the chamber 4 of said recess to the end of the member 1, as clearly shown in the drawings.

The recess in the female member 1 of the coupling is made in such a manner that the enlargement or head portion 3 of the member 2 may be inserted therein and withdrawn therefrom only when the sections stand at angles to each other, as indicated in dotted lines in Fig. 2, the chamber 4 in the member 1 being made for this purpose somewhat undercut, as will be readily seen by inspection of Fig. 2.

In order to permit a pivotal movement of the members of the coupling to bring them in line with each other after the head 3 has been inserted in the chamber 4, the shoulders 7 on opposite sides of the neck 5 of the member 2 are concave and the end 8 of the member 1 is convex. This construction enables the shoulders 7 and end 8 to slide upon each other in close engagement when the two members are moved into alinement.

The adjacent ends of the respective members 1 and 2 of the coupling are provided with circumferential grooves or recesses 9 and 10, which are adapted to correspond, when the members are united and in line with each other, to form a single circumferential groove, as shown in Fig. 1, wherein is held a locking collar or ring 11, arranged to slide longitudinally along the recessed portion of the male member 2. This collar or ring 11 is held on the member 2 when the members of the coupling are separated, but when the engaging devices of the members are interlocked, as shown in Figs. 1 and 2, the collar or ring will be slid endwise to the position shown in those figures, so as to engage with the recesses of both members and lock the same together against movement.

The coupling constructed as above described is extremely simple and inexpensive and permits of coupling the two parts or members securely together, while permitting them to be readily detached when necessary, so that the coupling is adapted for use in connection with rods, shafts, bell-cords for railway-cars, belts, &c.

Thus it will be seen that the improved coupling is especially well adapted for coupling two parts or sections, since it serves to hold them securely together, while permitting them to be readily and conveniently detached; and it will also be obvious that the invention is capable of some modification without material departure from its principles and spirit, and for this reason I do not wish to be understood as limiting myself to the precise form and arrangement of the parts herein set forth.

Having thus described my invention, I claim—

1. A coupling for rods, shafts and the like, comprising a male and a female member connected respectively with the sections of the rod or shaft to be joined, the male member being formed of a ball-like head or enlargement and a neck connecting said head to its section, and the female member being formed with a recess comprising a chamber adapted to receive the head of the male member, and a reduced portion extending from said chamber to the end of the member and adapted to receive the neck of the male member, the said chamber being undercut to permit the insertion of the said head in the chamber when the members are at an angle to each other, and the engaging end surfaces of the members being curved to permit the members to be moved into line with each other after the head has been inserted in the said chamber, substantially as set forth.

2. A coupling for rods, shafts and the like, comprising a male and a female member adapted to be secured on the ends of the sections of the rod or the like to be joined, the male member having an enlargement or head at its end and being provided with a reduced and flattened neck connecting said head with its section, and the female member being provided with a recess comprising a chamber to receive said head or enlargement, and a reduced portion for the reception of the neck of the male member, said members being each formed with a circumferential groove or recess, said grooves or recesses corresponding with each other when the members of the coupling are in alinement, and a collar or ring arranged in the circumferential recess or groove of one member and adapted to be moved so as to extend over the end of each member of the coupling and hold the members locked together, substantially as set forth.

In testimony that I claim the foregoing as my own I have hereto affixed my signature in the presence of two witnesses.

THOMAS CLAY EDWARDS.

Witnesses:
E. K. ABBOTT,
FRANK WINHAM.